United States Patent [19]
Bartels et al.

[11] Patent Number: 5,129,265
[45] Date of Patent: Jul. 14, 1992

[54] MULTIDIRECTIONAL FORCE SENSOR

[75] Inventors: Sven Bartels, Markdorf; Johann Gansohr, Bermatingen, both of Fed. Rep. of Germany

[73] Assignee: Dornier GmbH, Friedrichshafen, Fed. Rep. of Germany

[21] Appl. No.: 558,743

[22] Filed: Jul. 26, 1990

[30] Foreign Application Priority Data

Jul. 26, 1989 [DE] Fed. Rep. of Germany ... 8909048[U]

[51] Int. Cl.$^5$ ............................................. G01L 5/16
[52] U.S. Cl. .............................. 73/862.04; 73/862.05; 338/5; 74/471 XY
[58] Field of Search ............ 73/862.04, 862.05, 862.06, 73/189, 147; 338/2, 5, 47; 244/236; 74/471 XY

[56] References Cited

U.S. PATENT DOCUMENTS 3,433,064 3/1969 Jacobson ...................... 338/5 X
3,447,766 6/1969 Palfreyman .................. 338/5 X

OTHER PUBLICATIONS

A. Heysez, DVL-Bericht Nr. 261, May 1963, p. 33.

Primary Examiner—Reinhard J. Eisenzopf
Assistant Examiner—E. Shopbell
Attorney, Agent, or Firm—R. H. Siegemund

[57] ABSTRACT

A force sensor in the integral/monolithic comprises a monolithic block of elastic material which includes a first, second and third plate; a first pair of leaf spring integrally interconnecting the first and second plate, so that the first and second plates can parallely vibrate relative to each other in a first direction; a second pair of leaf springs integrally interconnecting the first and the third plates so that the first and the third plates can parallely vibrate relative to each other in a second direction being at right angles to the first direction; a shaft clearing traverses a bore in the first plate and is affixed to the second plate; the third plate is provided for connection for force receiving; and strain gauges are placed on all the leaf springs to sense separately forces acting in the first and second directions.

5 Claims, 3 Drawing Sheets

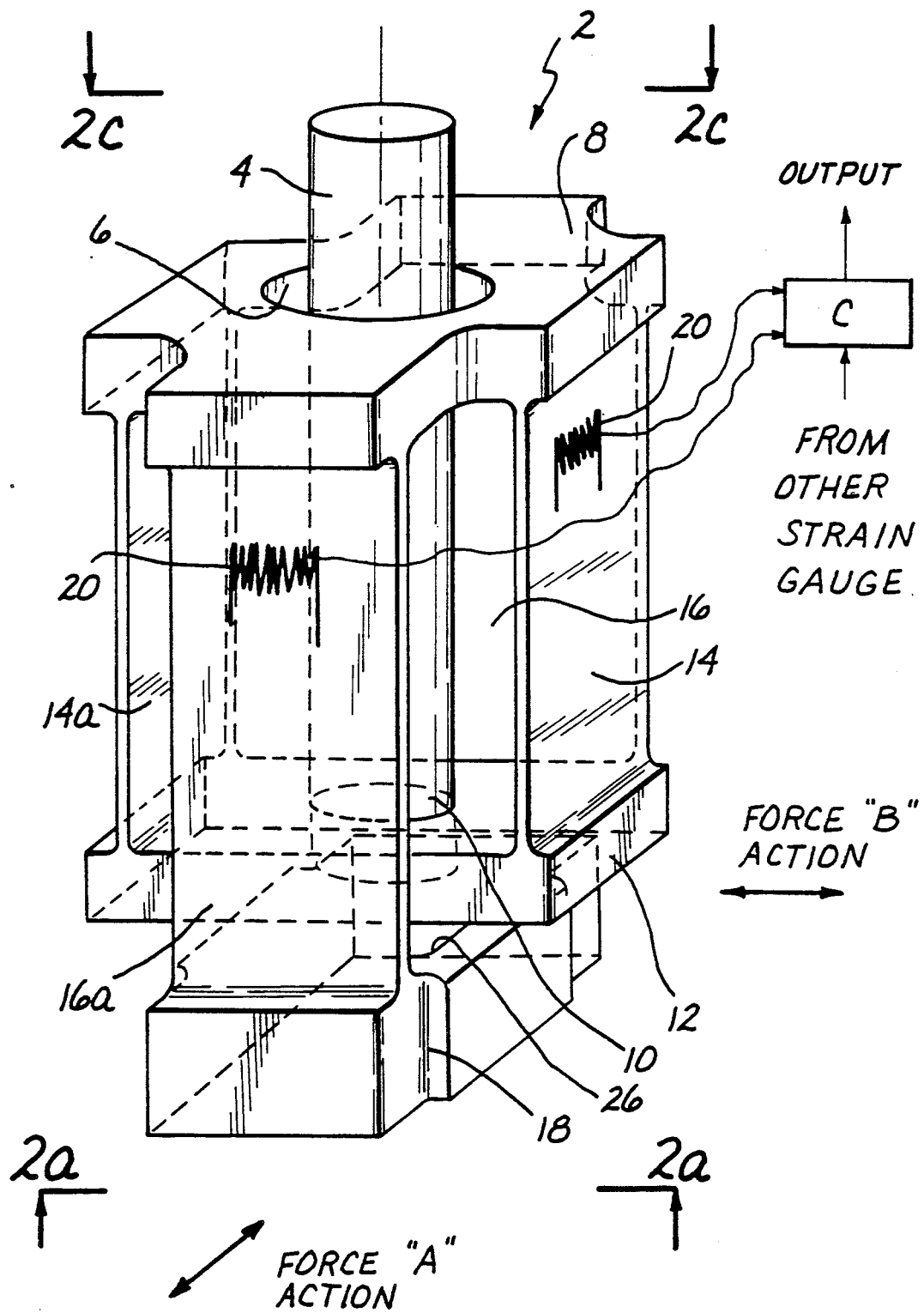

MULTIDIRECTIONAL FORCE SENSOR

BACKGROUND OF THE INVENTION

The present invention relates to a force sensor; more particularly the present invention relates to a sensor of faces that may act in different directions in relation to the physical structure of the sensor.

Multiaxes sensors are usually quite expensive and of course cannot "just" be used but only in conjunction with rather complex computer facilities and programs in order to extract force vector components and to generate force coordinate values for these vectors. As a consequence control loops using force sensors of this kind are not able or to a limited extent only, to respond adequately to initial unknown stop or collision points and forces, since in the case of collision the sensor will signal to the feedback control gradients in the force increase which usually the device is no longer capable of handling.

DESCRIPTION OF THE INVENTION

It is an object of the present invention to provide a new and improved, multidirectional force sensor.

It is a feature of the invention to make such a sensor of a single piece, monolithic or monoblocklike structure and of an elastic material such as spring steel; the features and details of the sensor have been, so to speak, carved preferably by means of spark erosion so that the block assumes the requisite geometry.

The particular geometry chosen here and suggested provides for a definite yielding of the sensor in different directions so that gradients as far as force increase is concerned remain within the limits that can be handled. The monoblock configuration establishes linear properties as well as good and useful hysteresis. The particular configuration provides in fact that force components directly in terms of their respective axes so that in fact computer aided vector generation is no longer needed. The monoblock in accordance with the invention is equipped on its side with strain gauge strips which are connected to signal amplifiers providing an output that directly represents the force as it acts in predetermined geometry relation to that strip.

Owing to the monolithic block geometry a definite yielding of the material is established with certainty. The configuration of connection pieces as long thin strips established elastic yielding of parallelograms which are arranged at right angles to each other but are in effect nested. Owing to the high tension that is effective, the monoblock configuration and particularly the used material maximum signal yield is established as far as the strain gauge strips are concerned. A preferred field of use is a sensor in the control stick of a pilot to measure the force he exerts upon the stick.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a perspective view of a sensor constructed in accordance with the preferred embodiment of the present invention.

Figure 2A:
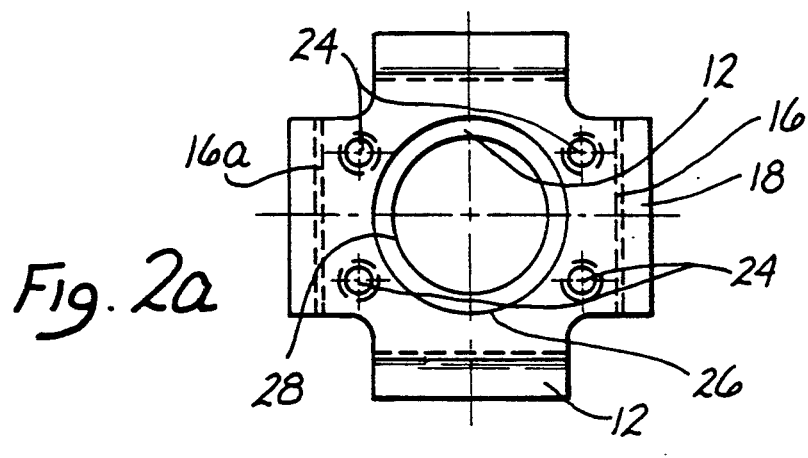
FIG. 2a is an end, bottom view of the force sensor shown in FIG. 1.

Proceeding now to the detailed description of the drawings, the sensor is basically comprised as a connect structure of an upper plate 8 on one hand, and a firs lower or intermediate plate 12 and a second lower plate 18 on the other hand. A holding shaft 4 is provided to attach the device to an external point of the sensor and has its low end 10 centrally attached to the intermediate plate 12. The shaft 4 traverses an opening 6 in the upper plate 8, and has a connecting end 10 stuck into an opening 28 of the plate 12.

Two lug like extensions of the upper plate 8 connect it to the plate 12 through relatively thin strips 14 and 14a. Second set of strips such as 16 and 16a connect two further extensions of the upper plate 8 to the plate 18, the latter connection being, as seen from the top, turned by 90 degrees as compared with the connection provided by the thin strips 14 and 14a. Owing to the staggering of plates 12 and 18 strips 16 and 16a are longer than strips 14 and 14a.

The connecting strips 14, 14a, 16 and 16a are basically relatively long and thin and establish therefore a good elastic yielding. They are leaf springs and these springs 14, 14a, 16 and 16a are about 0.8 mm thick. This way one can see that the plate 12, that was also termed an intermediate plate, can vibrate freely in the direction indicated in FIG. 1 by double arrow B. This vibration therefore is of the upper plate part 8, and assuming the plate 12 is affixed to shaft 4 regarded as a reference, but strictly speaking one can deem the vibration to be the other way around. In either case the vibrations occur in a plane being the plate of the drawing of FIG. 2d. Analogously vibration can obtain of the plate 18 and of top 8 in relation to each other owing to the thinness and elastic yieldability of strips 16 and 16a. These vibrations occur as indicated in FIG. 1 by double arrow A.

The connecting pieces or strips 14, 14a, 167, 16a are now provided with deformation sensors such as strain gauges and tension strips 20 which are connected to signal amplifiers in a circuit C. Thus, a force that is acting upon a sensor can be directly taken from the signals outputted by the strain gauge strips 20. Following due amplification these force values as so derivable from the tension strips are directly indicative of the forces acting in the directions A and B whereby the quality of the measurement permits ready discrimination as far as the direction is concerned.

Figure 2B:
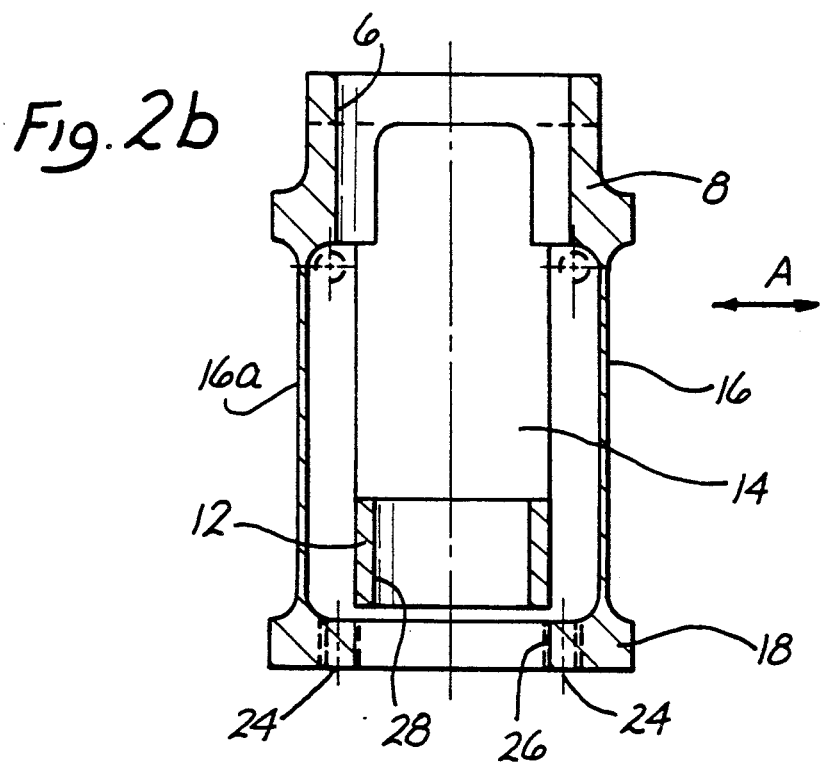
FIG. 2b is a longitudinal section view as indicated by 11b—11b in FIG. 2a and 12b.
Figure 2C:
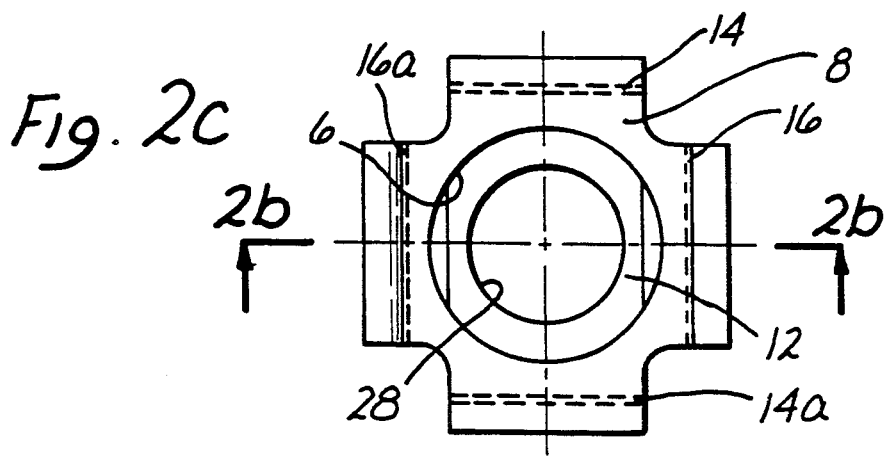
FIG. 2c is an opposite end or top view of the force sensor shown in FIGS. 1, 2a and 2b.

FIG. 2a-e show the sensor in various views and sections. Similar parts are denoted with similar references and characters and are of comparable nature. FIG. 2a and 2c as stated are illustration of the sensor in what could be termed bottom and top view but that direction is basically arbitrary; so one cold also say that these are views from one end and the opposite end. The particular plate 18 of the sensor 2 is provided with four bores 24; these bores are not shown in FIG. 1 and they are provided for introducing forces into the sensor. This is a particularly true as far as forces acting on the plate 18 are concerned.

Figure 2D:
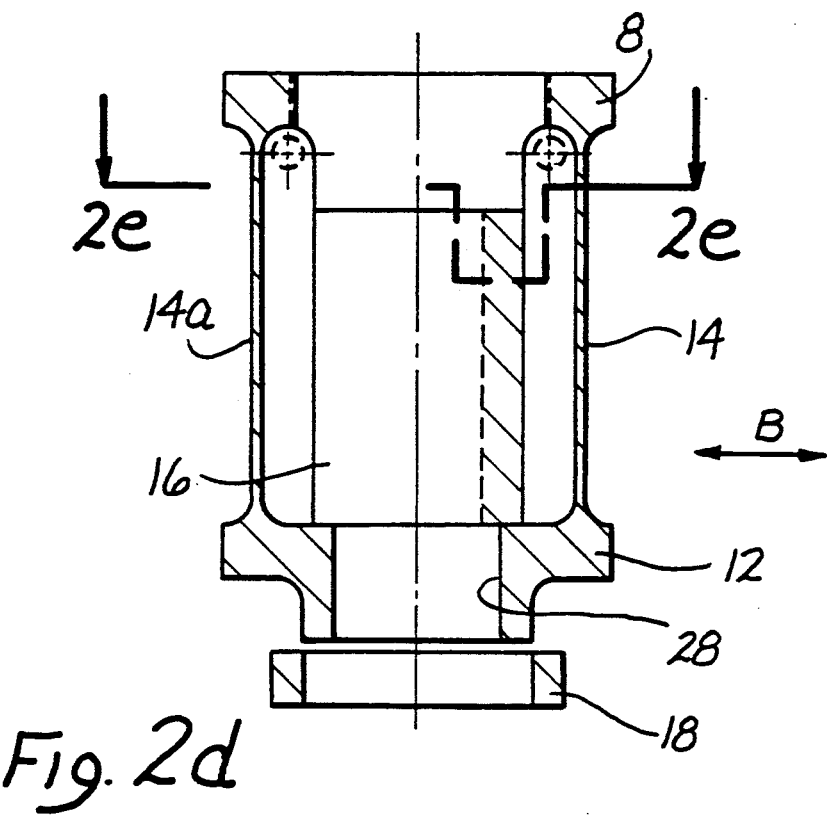
FIG. 2d is a longitudinal section view as indicated by 11d—11d in FIGS. 2a and 2e.
Figure 2E:
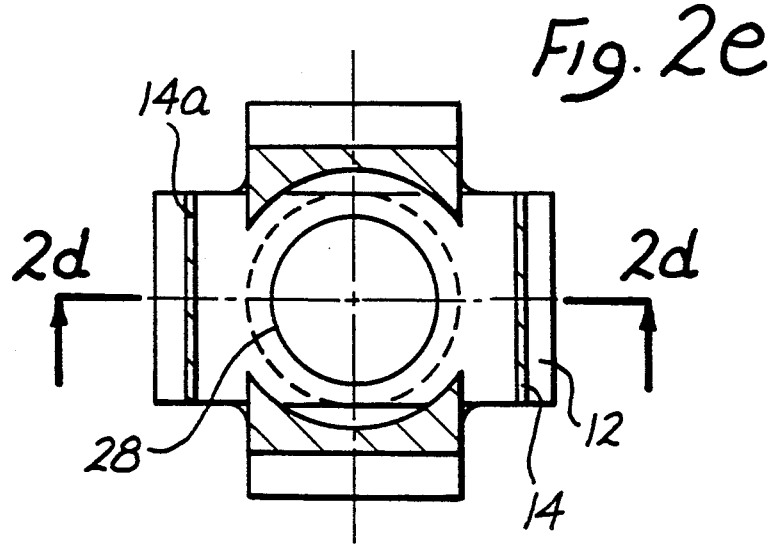
FIG. 2e is a section view as indicated by 11e—11e in FIG. 2d.

The lower plate 18 has also a bore 26 (FIG. 2c) and one can see through that opening, the plate 12 which has the bore 28 in what is affixed in registering relationship the end 10 of shaft 4 (not shown in FIG. 2a). The opening 6 (FIG. 2c) in the plate 8 on other end of the sensor is provided to accommodate and be traversed by that shaft 4 in clearing relation. As can be seen from FIG. 2b the connecting springs 16 and 16a together with the plates 8 and 18 establish a parallelogram where 12 swings relative to 8 (or vice versa) in the direction of double arrow A and FIG. 2d shows a parallelogram established by springs 14, 14a and plates 8 and 12. The latter vibrating parallel to each other in direction of double arrow B.

It is now important that 8, 12, 18 as well as 14, 14a, 16, 16a are all parts that have been worked out of a single block of material (monolith). The working was provided by means of spark erosion. Of course for carrying out this work various auxiliary bores are needed which later on will have no particular function. These bores are seen in FIG. 2b, 2b. The material used is spring steel having a high degree of homogeneity. Other materials such as RHF 33 which is a curable material and exhibits little distortion, or well other known antimagnetic materials are likewise usable for this purpose.

The invention is not limited to the embodiments described above but all changes and modifications thereof, not constituting departures from the spirit and scope of the invention, are intended to be included.

We claim:

1. Force sensor comprising an integral, monolithic block which includes two nested leaf spring parallelograms arranged at a 90 degrees angle to each other in which a first end plate is connected to a second oppositely positioned end plate and the first end plate is also connected to a still further positioned third end plate extending beyond the second end plate, the connection in each instance being provided by two leaf springs there being four leaf springs accordingly;

there being an opening in the first end plate; a shaft freely traversing said first end plate and being affixed to the second end plate; and deformation sensor means on all the leaf springs.

2. Sensor as in claim 1, being made of spring steel.

3. Sensor as in claim 1, the material of the block being RHF 33.

4. Sensor as in claim 1, said deformation sensing means being strain gauge strips.

5. A force sensor in integral (monolithic) construction comprising:

a monolithic block of elastic material which includes a first, a second and a third plate;

a first pair of leaf springs integrally interconnecting the first and second plate, so that the first and second plates can parallel vibrate relative to each other in a first direction;

a second pair of leaf springs integrally interconnecting the first and the third plate so that he first and the third plates can parallely vibrate relative to each other in a second direction being at right angles to the first direction;

a shaft clearingly traversing a bore in the first plate and being affixed to the second plate;

the third plate provided for connection for force receiving; and strain gauge means on all the leaf springs to sense separately forces acting in the first and second directions.

* * * * *